May 9, 1967  R. W. SHREWSBURY  3,318,697
COPY SHEET HAVING A LAYER OF THERMALLY
RUPTURABLE HOLLOW MICROCAPSULES
ON A CONDUCTIVE BACKING AND THE
METHOD OF USE
Filed April 28, 1964

FIG. 1

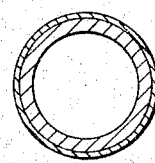
— ELECTRICALLY CONDUCTIVE COATING.
— THERMALLY RUPTURABLE CAPSULE WALL.

FIG. 2

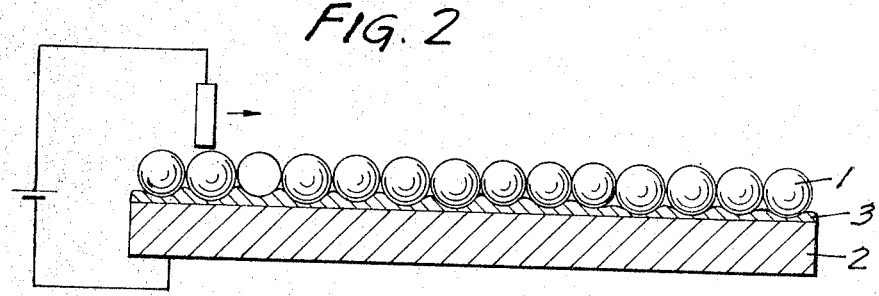

FIG. 3

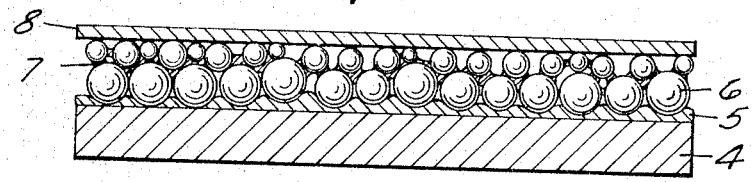

FIG. 4

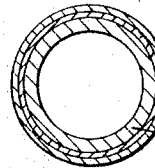
— PHOTOCONDUCTIVE COATING.
— ELECTRICALLY CONDUCTIVE COATING.
— THERMALLY RUPTURABLE CAPSULE WALL.

FIG. 5

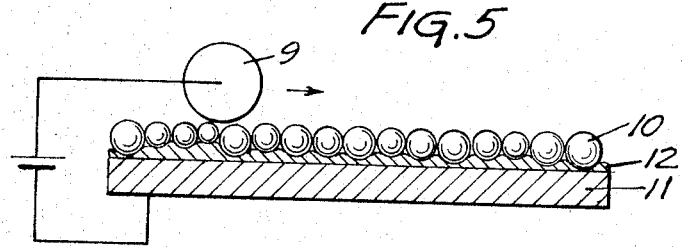

INVENTOR.
RAYMOND W. SHREWSBURY
BY
Carpenter, Abbott, Coulter & Kinney
ATTORNEYS

United States Patent Office 3,318,697
Patented May 9, 1967

3,318,697
COPY SHEET HAVING A LAYER OF THERMALLY RUPTURABLE HOLLOW MICROCAPSULES ON A CONDUCTIVE BACKING AND THE METHOD OF USE
Raymond W. Shrewsbury, St. Paul, Minn., assignor to Minnesota Mining and Manufacturing Company, St. Paul, Minn., a corporation of Delaware
Filed Apr. 28, 1964, Ser. No. 363,307
13 Claims. (Cl. 96—1)

This invention relates to novel microcapsules which are electrically rupturable, sheet constructions containing such microcapsules, and various processes in which such microcapsules can be usefully employed.

Microcapsules and microencapsulated products as well as various techniques for their preparation have been described in the literature, some of which are illustrated in United States Patent Nos. 2,183,053, 2,374,862, 2,730,456, 2,730,457, 2,730,458, 2,800,457, 2,969,330, 3,041,288, 3,111,407, and 3,116,206.

Microcapsules containing a liquid dye have been used in electrostatic color photography and electrostatic color printing, as shown in United States Patent No. 2,940,847, wherein microcapsules containing on their surface a photoconductor layer and a colored filter layer are randomly distributed on a conductive surface and are subjected to a light image while in an electrostatic field, causing selective migration of microcapsules to the other electrode. The microcapsules are then transferred to a suitable sheet material and ruptured under pressure to release the encapsulated subtractive dye corresponding to the particular color filter layer on the capsule surface, thus providing a color reversal image of the original light image. Pressure rupture of the microcapsules requires a separate physical treatment step and also is difficult to control in a satisfactory manner. Moreover, pressure rupture often tends to produce erratic results if such parameters as microcapsule diameter and wall thickness are not carefully regulated.

Microencapsulated products have also found uses outside the field of image recordation. They have been used to contain vitamin-bearing oils, as shown in United States Patent No. 2,183,053. However, physical rupture or chemical destruction of the capsule has been used to release its contents.

It is an object of this invention to provide microcapsules capable of electrical rupture.

Another object of this invention is to provide electrically rupturable microcapsules in a sheet construction.

Still another object of this invention is to provide an image recording media containing electrically rupturable microcapsules.

Yet another object of this invention is to provide a novel, light sensitive copysheet which can be developed electrically.

A further object of this invention to provide a copysheet and a dry recording process capable of reproducing black-and-white and colored images.

FIGURE 1 is an enlarged cross sectional view of a thermally rupturable microcapsule of this invention.

FIGURE 2 is a cross sectional view of a copysheet containing thermally rupturable microcapsules.

FIGURE 3 is a cross sectional view of a photosensitive copysheet containing thermally rupturable microcapsules.

FIGURE 4 is an enlarged cross sectional view of a photosensitive, thermally rupturable microcapsule.

FIGURE 5 is a cross sectional view of another photosensitive copysheet containing photosensitive, thermally rupturable microcapsules.

The novel microcapsules of this invention are thermally rupturable hollow capsules (hereinafter called "microcapsules") having a maximum diameter of about 200 microns, the exterior surface of the capsule wall being electrically conductive and electrically continuous. As shown in FIGURE 1, the microcapsules are made from thermally rupturable materials, i.e. materials which are physically displaced under the influence of heat by splitting, breaking, shattering, melting, decomposing, volatilizing and/or other displacement mechanisms, including internal pressure generation due to heating, to permit ready penetration thereof by the contents of the hollow capsule. Solid spheres of thermally rupturable materials are therefore not microcapsules within the ambit of this invention. The exterior surface of the microcapsule wall is made electrically conductive and electrically continuous (i.e. permitting electrical current flow) either by the inclusion in the surface of materials which are electroconductive or by the deposition of electroconductive substances as a layer or coating thereon. "Electroconductive" as used herein refers to materials which have a volume resistivity in the dark below about $10^3$ ohm-cm. and does not include materials which change in conductivity upon light exposure. Suitable thermally rupturable materials include natural polymers and synthetic polymers (such as polyvinyl alcohol, polypropylene, urea formaldehyde resins, etc.), gelatin, carnauba wax, and other gelled film-forming hydrophilic colloid materials, glass etc. Inorganic or organic materials which have a volume resistivity of at least about $10^3$ ohm-cm., preferably insulative materials with a volume resistivity above about $10^8$ ohm-cm., are useful. The capsule wall material should have at least about 10 times the resistivity of the electroconductive surface material.

Microcapsules can be readily tested for thermal rupturability in the following manner. A tungsten wire (6 mil diameter, 0.2 inch long) is connected to a 100 microfarad capacitor which is charged to about 175 volts. The tungsten wire is brought into contact with a hollow microcapsule and the capacitor is discharged, the current surge heating the wire to about 800° C. Microscopic examination of the thus thermally pulsed microcapsule reveals any thermal rupture resulting from cracking, melting, volatilization, etc., including the liberation of or revelation of the microcapsule contents. "Thermal rupturability" of filled or unfilled microcapsules is determined and defined in the above-described manner.

Although the outer surface of the microcapsule wall itself can be modified, e.g. by impregnation, to provide the desired electrically conductive characteristics of its surface, it is preferable to superimpose over the entire capsule surface a thin, electrically continuous film or coating of an electrically conductive material, such as aluminum, nickel, copper, silver, other conductive metals, carbon, etc., preferably a thin continuous metal film. The conductivity of this electrically conductive material is usually significantly higher than that of the underlying, normally insulative cell wall material and is preferably at least 10 times higher. The thickness of the metal coating is normally about 20% of the uncoated microcapsule wall thickness, which generally varies from 1 to about 20 microns. Accordingly, the metal coating thickness generally varies from 0.2 to 4 microns. It has also been observed that microcapsules which are thermally rupturable generally become more easily rupturable when provided with an electrically conductive surface layer.

The thermally rupturable microcapsules may be provided with an electrically conductive outer surface by coating with a powdered material such as carbon, aluminum flakes, etc. In another method a conductive layer may be prepared by vapor deposition of a metal, such vapor deposition techniques being well known. In still another preferred method a metal coating may be prepared by electroless plating, such techniques being described in United States Patent Nos. 2,658,839, 2,690,401–3, 2,702,253 and 3,011,920.

The thermally rupturable capsules of this invention find many uses which take advantage of both their thermal rupture capability and their electrically conductive characteristics, permitting controlled or selective release of the capsule contents. The mechanism of rupture involves ohmic heating, probably resulting from high electrical current density at a localized point on the electrically conductive layer of the microcapsule.

In one method for the reproduction of light images the thermally rupturable microcapsules of this invention may be incorporated into a sheet construction, shown in FIGURE 2, by providing a uniform layer 1 of such capsules on, and in electrical contact with, an electrically conductive substrate or sheet material 2, preferably by adhering the particles to the sheet by partially embedding them in the substrate or in an electrically conductive adhesive 3. The essentially spherical microcapsules should be of relatively uniform size and are preferably disposed in a manner providing inter-particle contact between adjacent microcapsules. If desired, an insulative binder may be used to fill the interstices between the capsules to assist in maintaining the physical integrity of the capsule layer. Such a sheet construction can be used for facsimile reproduction, the conductive backing being connected in the usual manner with a stylus traversing the surface of the sheet and constituting the other electrode, as shown in FIGURE 2. For such purposes the capsules contain suitable marking material, e.g. colored dyes or materials capable of color forming reaction, preferably liquids, which are released and become visibly discernible upon rupturing the capsule wall. Actual rupture occurs upon current passage between the stylus and the conductive backing, the current flowing through the electrically conductive capsule coatings. A tightly packed monolayer of capsules is sufficient, although several layers of capsules may be used if the packing density is such that electrical contact between capsules in the various layers is maintained and a continuous electrical path is provided from the stylus to the conductive backing. To insure effectively complete and uniform coverage of the backing with microcapsules, more than a monolayer is normally preferred, particularly if the diameters of the capsules vary significantly.

As mentioned earlier, the microcapsules used in image formation processes usually contain colored dyes or other substances which are released upon capsule rupture to form a visible indicia. One useful alternative procedure involves the encapsulation of a reactant which is capable of participating in a chemical reaction producing a color change. Such microcapsules can be incorporated into the sheet construction in random admixture with other microcapsules containing a suitable coreactant, simultaneous rupture permitting the color forming reaction to proceed. Instead of encapsulating all coreactants, one of the coreactant materials can be otherwise distributed in or adjacent to the microcapsule layer, where the release of capsule contents permits their admixture and causes the reaction to proceed. For example, if an acid sensitive indicator dye, such as Methyl Yellow (Color Index No. 19), is distributed in the microcapsule layer, e.g. by dissolving or dispersing the dye in a suitable insulative binder, and the encapsulated material is acidic in nature, rupture effects release of the acidic material and causes color change of the acid sensitive dye in the area adjacent the ruptured microcapsule.

The thermally rupturable microcapsules of this invention can also be used in light sensitive sheet construction. As shown in FIGURE 3 a sheet having a conductive backing 4, a conductive adhesive layer 5, and a layer of microcapsules 6 in an insulative matrix 7, is provided with a uniform photoconductive topcoating 8. Topcoating 8 represents a composition which alters its electrical conductivity upon exposure to actinic light or other form of radiant energy, thus serving as a light activated current passing device. Photoconductive coatings, such as those described in United States Patents Nos. 3,010,884, 3,051,569 and 3,052,540, including a photoconductive material (e.g. zinc oxide, selenium, etc.), dispersed in an insulative binder when in particulate form, are preferred. If desired, such photoconductive topcoating can alternatively be deposited directly on the electrically conductive coating of the microcapsule, as shown in FIGURE 4, completely encasing the capsule. By vapor depositing a photoconductive material directly onto the microcapsules, either before or after their incorporation into a sheet, a thin coating can be provided and the necessity for a binder can be eliminated. Organic as well as inorganic photoconductors may be used.

In FIGURE 5 a light sensitive copysheet prepared with the microcapsules as shown in FIGURE 4 is developed, after or during exposure to a light image, by slowly passing a conductive roll 9 over the surface of microcapsule layer 10. The conductive backing 11 of the copysheet is connected to the conductive roll 9 through a source of electrical potential. Either direct or alternating current may be used. As the roll contacts the surface of a microcapsule which has been exposed to light, thereby lowering the resistance across the photoconductive coating in the light struck areas, current passes through the exposed photoconductive coating, the underlying electrically conductive coating, the unexposed photoconductive coating at the non-exposed bottom portion of the microcapsule, the electrically conductive adhesive layer 12 and the conductive backing 11. A somewhat more efficient copysheet, providing a greater differential in conductivity ratio between the light struck and background areas, can be achieved by using the copysheet construction of FIGURE 3 with the capsules of FIGURE 1, the microcapsule layer in this embodiment being overcoated, e.g. by vapor deposition, with a suitable photoconductor material. The high current density at those areas of point contact between the microcapsules and between the roll and the microcapsules produces rapid heat generation and consequent thermal rupture of the microcapsule wall, thus releasing the contents and providing a localized visible mark. In place of the roll 9, a brush with metal bristles, multiple styli or other suitable contacting device providing essentially point contact with the microcapsules can be used.

Since two or more reactant materials can be individually encapsulated and then admixed for use as a free flowing capsule mass or as an integral part of a sheet construction, a variety of reactions can be controllably initiated by electrical capsule rupture. For example, certain adhesives normally handled as two-part systems (e.g. epoxy adhesives) can be effectively handled as a one-part system by encapsulating one or more of the reactive components. A tube or other container can be filled with a curable resin and microencapsulated catalyst. By positioning wire contacts on a grid, connected to a source of electrical potential, in the restricted container orifice, selective electrical rupture of the capsules can be achieved as the resin-capsule mixture is removed from the container, releasing the catalyst and initiating the curing reaction. As another example, a light sensitized printing plate can be prepared by admixing light sensitive capsules, some of which contain curable or hardenable resins and other of which contain curing catalysts or hardeners, of the type shown in FIGURE 4. Such capsules are randomly dispersed throughout the capsule layer 10 of the sheet construction shown in FIGURE 5. After exposure of the light sensitive sheet construction to a light image, the sheet or plate can be electrically developed in the manner shown in FIGURE 5, capsule rupture in the light struck areas releasing catalyst and curing or hardening the curable resin or hardenable material in those areas. The uncured resin in the background areas can then be removed by a conventional solvent wash, leaving a raised image firmly adhered to the electrically conductive backing, or by intimately contacting the sheet surface with a roller or another sheet to which the material in the background areas adheres or transfers. If the curable or hardenable resin in such light sensitized printing plates is made electrically conductive, it can be used as the adhesive for bonding a catalyst containing capsule layer to the electrically conductive substrate. When the image and background areas have different wetting properties, such plates or sheets may be used as lithographic masters.

In order to utilize the above techniques for the preparation of full color prints from a positive image, microcapsules of the type shown in FIGURE 4 containing red, green and blue dyes are admixed in random manner and deposited on the copysheet, the photoconductive coatings being selectively sensitized to red, green and blue light corresponding to the colored dye contained therein. When such sheets are exposed to a colored image, only those capsules which are sensitive to the appropriate wave length will become sufficiently conductive to permit current flow and hence capsule rupture and release of the colored dye. A separate exposure and electrical development step for each color is preferred, and color separations or appropriate filters can be employed in this procedure. Since the conductivity of the photoconductive material is proportional to the light exposure, mixing capsules having different coating thicknesses of photoconductor may be used to produce enhanced tone gradation.

In some instances it may be desirable to fix or stabilize the contents released from the microcapsules. For example, a monomeric, partially polymerized or partially cured material released from the microcapsules may be further polymerized or cured by the application of heat with or without the application of a suitable catalyst. If the released microcapsule contents are reactants capable of further reaction, e.g. dye precursors, the appropriate coreactants may be applied to the sheet after microcapsule rupture, thereby forming a visible image. As an alternative procedure, a second sheet or receptor containing the appropriate coreactants may be brought into contact with the released contents to provide a visible image on the second sheet or receptor. Multiple copies may be prepared in this manner.

The following examples will serve to illustrate this invention but are not intended to limit the scope thereof.

EXAMPLE I

Microcapsules varying in diameter from about 50 m. to 100 m. were prepared according to the teaching of French Patent No. 1,323,048. These capsules contained 1% Sudan IV dye (C.I. 258) in toluene. The shells of the capsules were of urea-formaldehyde. These capsules were then coated by shaking 5 grams of them in 5 grams lampblack. The capsules were then separated from the excess lampblack by screening. The coated capsules were then placed with a camel's hair brush between and in contact with both of two aluminum plates separated by a gap. They were dusted over the gap so as to bridge the gap. The whole was then placed on the stage of a microscope. The particles were observed when the circuit was closed with a current source at 15 volts A.C. and about 8 milliamperes. Substantially all of the capsules having contact were seen to break, with consequent release of their colored contents.

EXAMPLE II

Capsules were prepared as in Example I. These were then coated in the following bath:

Distilled $H_2O$—250 cc.
$AgNO_3$—12.5 gm.

To this solution was added dropwise with constant stirring, about 16.0 cc. of 28% $NH_4OH$ until the solution was almost clear, after going through a deep brown turbidity. About 25.0 gm. of the capsules were then immersed in this bath and wetted. There was then added a solution consisting of 8.0 gm. of anhydrous dextrose dissolved in 25.0 cc. distilled $H_2O$. 125.5 cc. of a solution of 10% KOH in distilled $H_2O$ was then added. After three minutes of further stirring, the capsules were removed from the solution and washed with $H_2O$. They were observed to be uniformly coated with a bright metallic coating.

These were dried and then tested for electrical conductivity (breakage as in Example 1) and found to behave in the same manner, except for greater conductivity as evidenced by the fact that only 6.0 volts were required to rupture substantially all of the capsules.

Individual capsules were then placed in a setup on a microscope stage whereby they had contacted with them on about diametrically opposed positions on their surfaces opposite poles of an electric current source, in circuit with a milliameter and voltmeter. The circuit was closed and the individual capsules instantaneously ruptured. It was observed that at rupture there were 7.0 volts at 2.5 ma.

EXAMPLE III

An electroconductive layer of carbon black using lacquer as a binder or film former about .001 inch in thickness was spread over a sheet of paper-backed aluminum foil. A monolayer of electroconductive capsules prepared by coating in the same manner as the capsules in Example II was then embedded in the carbon black so that the individual capsules, while in contact at their bottom poles with the aluminum foil, were also in contact over a portion of the surfaces of their lower hemispheres with the carbon black, with their upper hemispheres exposed. There was then applied to the whole of the laminate a thin layer of a mixture consisting by weight of 10 parts of titanium dioxide to 1 part of lacquer solids in a volatile organic solvent, so as to leave exposed and uncovered the top portion of each capsule. After the solvent had evaporated, a thin electrically insulating layer of lacquer and titanium dioxide was left. A thin layer of photoelectrically conductive substance consisting by weight of 10 parts of indium oxide to 1 part of lacquer solids in a volatile organic solvent was then spread over the whole in a continuous layer sufficiently thick to cover the capsules, and allowed to dry by evaporation of the solvent. This last layer was applied in the presence of red light, inasmuch as the indium oxide is relatively more sensitive to other portions of the light spectrum.

This was kept in the dark until exposed as follows: Light from a 350-watt photoflood reflector type bulb was projected through a patterned mask onto the photoconductive surface at a distance of about 18 inches, for a period of 10 minutes, at the end of which time the light was turned off and the mask was removed. An electric current was then passed through the laminated sheet by connecting the negative pole of a 15-volt direct current source with the aluminum foil base sheet, and stroking the surface of the photoconductive top (indium oxide containing) coat with an aluminum bristled brush, the soft bristles of which were connected to the positive pole of the direct current source. After stroking the surface lightly and briefly so that all areas were electrically contacted at least once, the pattern of the mask appeared in red where the surface had been exposed to the light. The laminate was then examined microscopically, and it was observed that in the areas now visibly colored red, the dye had been released from the capsules which previously contained it.

Although the above description relates primarily to image recording it is also desirable to employ electrically rupturable microcapsules in the encapsulation of various materials, preferably liquid in nature, such as perfumes, pesticides, flavors, surfactants, solvents, drugs, etc., and electrically rupturable capsules having a diameter up to about 1000 microns can be useful in such instances.

Various other embodiments of the present invention will be apparent to those skilled in the art without departing from the spirit and scope thereof.

What is claimed is as follows:

1. A copysheet which comprises an electrically conductive backing and, in electrical contact therewith and physically bonded thereto, an electrically conductive layer of microcapsules substantially coextensive with said backing, said microcapsules comprising thermally rupturable hollow capsules having a maximum diameter of about 200 microns, having an image forming component therein and having an electrically continuous conductive exterior surface.

2. A copysheet which comprises an electrically conductive backing and, in electrical contact therewith and physically bonded thereto, an electrically conductive layer of microcapsules substantially coextensive with said backing, said microcapsules comprising thermally rupturable, insulative hollow capsules having a maximum diameter of about 200 microns, having an image forming component therein and having an electrically continuous conductive coating on the entire exterior surface thereof.

3. The article of manufacture of claim 2 in which said microcapsules contain a liquid material.

4. The article of manufacture of claim 3 in which said microcapsules contain a colored dye.

5. The article of manufacture of claim 3 in which said microcapsules contain a color-forming reactant.

6. The article of manufacture of claim 3 in which the electrically continuous conductive surface of said capsule contains a photoconductive coating thereon.

7. A copysheet which comprises (1) an electrically conductive backing, and in electrical contact therewith and physically bonded thereto, (2) an electrically conductive layer of liquid containing microcapsules substantially coextensive with said backing, said microcapsules comprising thermally rupturable hollow capsules having a maximum diameter of about 200 microns, having an image forming component therein and having an electrically continuous conductive exterior surfaces, and (3) a photoconductive topcoating thereon.

8. A process which comprises: exposing to a light image a copysheet comprising (1) an electrically conductive backing and, in electrical contact therewith (2) an electrically conductive layer of microcapsules, said microcapsules comprising thermally rupturable hollow capsules having a maximum diameter of about 200 microns and having an electrically conductive coating thereon and (3) a photoconductive topcoating over said layer of microcapsules; and impressing an electrical potential between said electrically conductive backing and the surface of said photoconductive topcoating to effect selective electrical current flow transversally through the light exposed photoconductive topcoating and adjacent electrically conductive layer of microcapsules and produce localized ohmic heating and selective thermal rupture of said microcapsules.

9. The process of claim 8 in which said microcapsules contain a flowable material.

10. The process of claim 8 in which said microcapsules contain a colored dye.

11. The process of claim 8 in which said microcapsules contain a color-forming reactant.

12. The process of claim 8 in which said microcapsules contain a catalytic reagent.

13. The process of claim 8 in which said microcapsules comprise an intimate admixture of at least three types of capsules, each type containing a different color dye encapsulated therein and a photoconductive topcoating sensitized in accordance with said dye.

References Cited by the Examiner

UNITED STATES PATENTS

| | | | |
|---|---|---|---|
| 2,766,630 | 8/1956 | Lakso | 206—56 |
| 2,939,804 | 6/1960 | Schossberger | 117—17.5 |
| 3,080,251 | 3/1963 | Claus | 117—17.5 |
| 3,140,175 | 7/1964 | Kaprelian | 117—17.5 |

RALPH G. NILSON, *Primary Examiner.*

W. F. LINDQUIST, *Assistant Examiner.*